No. 758,785. PATENTED MAY 3, 1904.
D. M. SHALER.
ELECTRIC RAILWAY TROLLEY.
APPLICATION FILED AUG. 6, 1903.
NO MODEL.
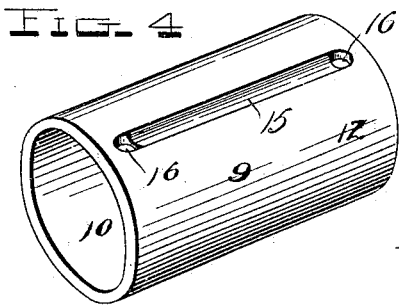
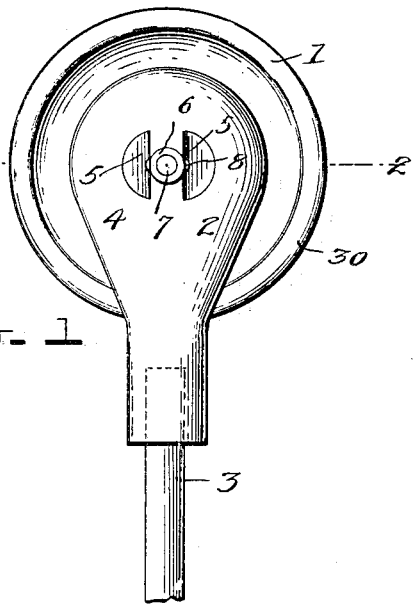
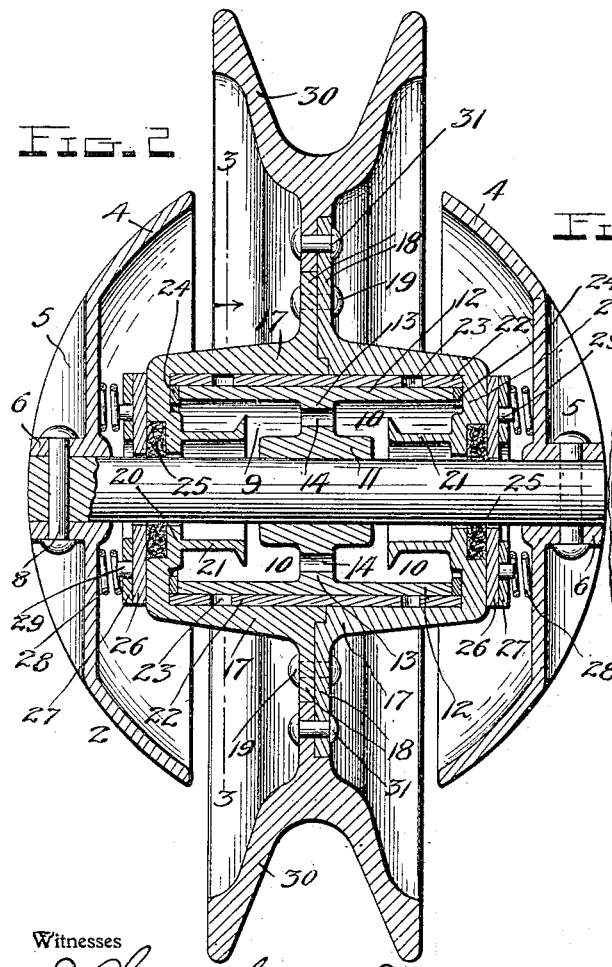
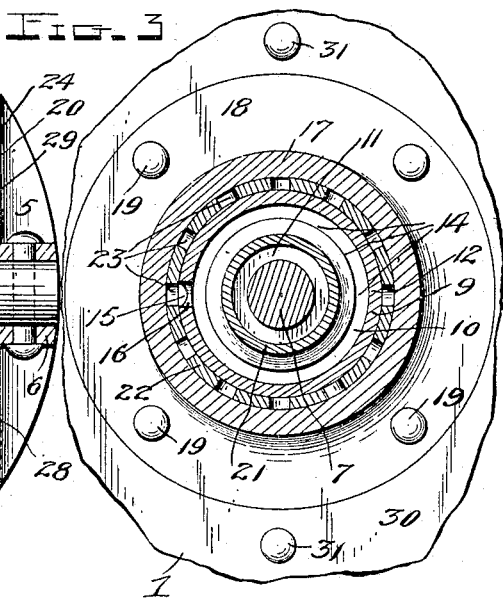
Witnesses
Inventor
D. M. Shaler
By H. B. Wilson
Attorney No. 758,785.                                                    Patented May 3, 1904.

UNITED STATES PATENT OFFICE.

DAVID M. SHALER, OF STRYKER, OHIO.

ELECTRIC-RAILWAY TROLLEY.

SPECIFICATION forming part of Letters Patent No. 758,785, dated May 3, 1904.

Application filed August 6, 1903. Serial No. 168,500. (No model.)

*To all whom it may concern:*

Be it known that I, DAVID M. SHALER, a citizen of the United States, residing at Stryker, in the county of Williams and State of Ohio, have invented certain new and useful Improvements in Electric-Railway Trolleys; and I do declare the following to be a full, clear, and exact description of the invention, such as will enable others skilled in the art to which it appertains to make and use the same.

My invention relates to new and useful improvements in trolley-wheels; and it consists in certain novel features of construction, combination, and arrangement of parts, as will be hereinafter fully set forth and claimed.

The object of my invention is to provide a device of this character which will be simple in construction and durable in use and in which the trolley-wheel will have an oil-retaining bearing which will greatly increase the efficiency of the device.

In the accompanying drawings, forming a part of this specification, Figure 1 is a side elevation of my improved trolley-wheel, showing the same mounted in the trolley-head. Fig. 2 is a sectional view through the same, taken on the line 2 2 of Fig. 1, the parts being on an enlarged scale. Fig. 3 is a detail sectional view taken on the line 3 3 of Fig. 2. Fig. 4 is a detail view of the fixed bearing-sleeve.

In the embodiment of my invention as illustrated in the drawings the numeral 1 denotes a trolley-wheel, 2 a forked or bifurcated head or harp in which it is journaled, and 3 the upper end of a trolley-pole upon which said head may be mounted in any desired manner. In the center of each of the arms 4 of the head are depressions 5 and sockets 6, in which the ends of a shaft or journal 7 are riveted, as at 8. Fixed upon the center of said shaft between said arms is a bearing 9, which is hollow to provide an oil space or chamber 10. Said bearing consists of a hub 11, fixed to the shaft, a cylindrical bearing-sleeve 12, and an annular web 13, which connects said hub and sleeve and which is perforated, as at 14, to afford communication between the oil-space upon each side of said web. The periphery of said sleeve 12 is provided with a longitudinal groove 15, at each end of which is an opening or aperture 16, which permits the oil in the chamber 10 to flow into said groove, which is disposed upon the under side of said sleeve or at its lowermost point, so that the oil in the chamber will readily enter the apertures 16.

Surrounding the sleeve 12 and mounted to rotate upon the same is the split hub 17 of the trolley-wheel 1. Said hub consists of two half-sections formed at one end with outwardly-projecting annular flanges 18, which are riveted together, as shown at 19, in order to secure the hub upon its bearing. The opposite and outer ends of said hub-sections are closed by integral heads 20, which are apertured to permit the shaft 7 to project through them. Projecting inwardly into the oil-chamber from the inner sides of said heads 20 are integral annular flanges 21, which surround the shaft to prevent the oil dripping upon the same and to retain the oil in said chamber. Interposed between the inside of the hub and the sleeve 12 is a steel or fiber bushing in the form of a cylinder 22, which is provided with one or more annular rows of perforations 23, adapted to take up oil from the groove 15 in the bearing-sleeve 12 as the wheel rotates upon the same, and thus lubricate the bearing or contact surface between said sleeve and bushing. In order to relieve the end thrust of the hub of the wheel, I interpose fiber washers or rings 24 between the ends of the sleeve 12 and the heads 20 of the hub-sections, and to prevent the leakage of oil around the shaft 7 I provide the outer faces of the heads 20 with annular recesses 25, in which a packing of felt or other material is retained by collecting rings or washers 26, which surround the shaft. Said rings 26 are forced against the heads 20 by pressure-rings 27, which are actuated by springs 28, interposed between the inner concave faces of the arms 4 of the trolley-head and said rings 27. Apertures are formed in said rings 27 to receive studs 29 upon the rings 26, which prevent the rotation of said ring with the hub of the wheel. The grooved periphery 30 of the trolley 1 is preferably made separable, being secured to the flanges 18 by rivets 31, as shown.

The operation and advantages of my invention will be readily understood from the foregoing description taken in connection with the accompanying drawings. It will be seen that upon the rotation of the wheel oil from the chamber 10 will drop through apertures 16 into groove 15, which feeds it into the apertures 23, and the rotation of the bushing with the hub of the wheel will distribute the oil from said apertures 23 in the bushing between the latter and the bearing-sleeve 12, upon which it rotates.

By constructing the various parts as shown and described it will be observed that they may be readily taken apart for cleaning or repairs.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim, and desire to secure by Letters Patent, is—

1. The combination with a trolley-pole head, and a shaft carried thereby, of a cylindrical bearing on said shaft, open at its ends, formed with an oil-chamber and means to conduct oil from said chamber to its periphery, and a trolley-wheel mounted on said bearing and having a two-part hub, the parts of said hub being each formed with a head closing one end of the cylindrical bearing, said heads being formed with annular flanges projecting into the ends of the cylindrical bearing and surrounding the shaft to prevent oil dripping upon the same and to retail the oil in the chamber in said bearing, substantially as described.

2. The combination with a bifurcated trolley-pole head, of a shaft fixed between the arms of said head, a hollow cylindrical bearing-sleeve fixed upon said shaft and formed with an oil-chamber and oil-feeding apertures and grooves, and a trolley-wheel having a two-part hub mounted to rotate upon said bearing, said hub having closed ends formed with oil-retaining flanges projecting into said bearing-sleeve and with spring-pressed packing adapted to prevent the escape of oil from said chamber, substantially as described.

3. In combination with a bifurcated trolley-pole head, and a shaft carried thereby and extending between the arms thereof, a cylindrical bearing mounted to revolve on said shaft and having an oil-chamber open at the ends of said bearing, a trolley having a two-part hub mounted to revolve on said bearing, said hub having closed heads forming closures for the ends of said oil-chamber, and formed further with exteriorly-disposed packing-chambers, closures for said packing-chambers, and springs to retain said closures in place, said springs bearing against the inner sides of the arms of the trolley-head.

In testimony whereof I have hereunto set my hand in presence of two subscribing witnesses.

DAVID M. SHALER.

Witnesses:
H. M. KEYTSER,
FLORENCE J. BOYLAN.